Patented Jan. 8, 1935

1,986,881

UNITED STATES PATENT OFFICE 1,986,881

NEW CELLULOSE DERIVATIVES AND THEIR MANUFACTURE

Henry Dreyfus, London, England

No Drawing. Application November 18, 1930, Serial No. 496,573. In Great Britain December 23, 1929

7 Claims. (Cl. 260—101)

This invention is a continuation in part of my U. S. application S. No. 492,363 filed October 30, 1930 corresponding to British application No. 36474/29 and relates to the manufacture of new nitrogen-containing cellulose derivatives.

The said U. S. application S. No. 492,363 filed October 30, 1930 corresponding to British application No. 36474/29 describes inter alia the manufacture of nitrogen-containing cellulose derivatives by direct treatment of hydroxy ethers or esters of cellulose with organic bases including the organic ammonium bases and their salts, preferably under pressure.

I have now found that cellulose itself is capable of yielding nitrogen-containing derivatives when treated with such bases, and particularly with strong bases. Furthermore any cellulose derivative still containing hydroxy groups in the cellulose molecule may be similarly treated, for example incompletely etherified celluloses or celluloses incompletely esterified with acyl groups which are not saponified by the treatment. Celluloses which are incompletely or completely esterified with aliphatic acidyl groups, e. g. cellulose acetates, may also be used as starting materials, the first action of the organic bases being to saponify the ester groupings.

The present invention accordingly comprises the production of new nitrogen-containing cellulose derivatives by treatment with organic bases of cellulose, its near conversion products or materials containing cellulose, or cellulose derivatives containing free hydroxy groups in the cellulose molecule or cellulose esters of aliphatic acids. Primary and secondary amines and the organic ammonium bases and their salts, for example methylamine, dimethylamine, ethylamine, diethylamine or other alkylamines or dialkylamines, methylaniline, tetramethylammonium iodide, trimethylethylammonium iodide, methyl-triethylammonium iodide and the like, are particularly valuable.

The reaction may take some time to introduce a substantial amount of nitrogen and for this reason it is preferably conducted under pressure. The base may be applied in liquid or vapour form in conjunction or not with diluents, and preferably high boiling diluents.

The cellulose may be and preferably is pretreated to render it more reactive. For example it may be treated with organic or mineral acids or with alkalies or both, e. g. with acetic acid, formic acid, sulphuric acid, hydrochloric acid, or mixture of any of these acids, or with caustic soda, caustic potash or the like. Wood pulps are preferably substantially deprived of lignin, pentosan, resin and like constituents, that is to say they are preferably employed in the form of chemical wood pulps, such as sulphite pulp, sulphate pulp or soda pulp. In using the chemical wood pulps a pretreatment of the type described in my U. S. Patent No. 1,711,110 is of great advantage. The regenerated celluloses, for example cellulose regenerated from viscose or from cuprammonium solutions of cellulose are, also particularly amenable to the present treatments. The invention includes the treatment of celluloses or cellulose-containing materials in yarn, fabric or other fibrous form so as to impart thereto the property of affinity for acid wool dyestuffs.

The temperature of treatment may vary widely with the type of cellulose or cellulose derivative used as starting material, with the pressure and with the organic base employed. In general high temperatures, for example temperatures of the order of 150 to 200 to 250° C., are preferable.

The following example shows the best method known to me for carrying the invention into effect, but is not to be construed as limiting the invention in any way:—

Example

Cotton linters or cotton fabrics which have been pretreated with organic or mineral acids or mixtures thereof or regenerated cellulose or any of the cellulose derivatives referred to above in powder or fabric or yarn form are introduced into an autoclave together with about ten times their weight of a concentrated aqueous solution of mono- or di-methylamine or -ethylamine, the autoclave closed and the contents raised to a temperature of 180–220° C. and maintained at that temperature for 2–6 hours. After cooling the treated material is well washed with water and dried. It has an affinity for acid dyestuffs.

What I claim and desire to secure by Letters Patent is:—

1. Process of producing cellulose derivatives having an affinity for acid dyestuffs which comprises acting at 150°–250° C. with an aqueous solution of an amine on hydroxy groups directly attached to cellulose residues until the product contains fixed nitrogen.

2. Process of producing cellulose derivatives having an affinity for acid dyestuffs which comprises acting under pressure at 150°–250° C. with an aqueous solution of an amine on hydroxy groups directly attached to cellulose residues until the product contains fixed nitrogen.

3. Process of producing cellulose derivatives having an affinity for acid dyestuffs which comprises acting at 150°–250° C. with an aqueous solution of an alkylamine on hydroxy groups directly attached to cellulose residues until the product contains fixed nitrogen.

4. Process of producing cellulose derivatives having an affinity for acid dyestuffs which comprises acting with an aqueous solution of an amine at 150 to 250° C. on a cellulose ester containing only carboxylic ester groups and continuing the reaction until the hydroxy groups formed by saponification are attacked and the product contains fixed nitrogen.

5. Process of producing cellulose derivatives having an affinity for acid dyestuffs which comprises acting on cellulose with acidic reagents to render it more reactive, and thereafter acting with an aqueous solution of an amine at 150 to 250° C. on the hydroxy groups directly attached to the cellulose residue until the product contains fixed nitrogen.

6. Nitrogen-containing cellulose derivatives having an affinity for acid dyestuffs in which the nitrogen of an amino group is directly attached to a carbon atom of the cellulose residue, said cellulose derivatives being produced by acting at 150°–250° C. with an aqueous solution of an amine on hydroxy groups directly attached to cellulose residues.

7. Nitrogen-containing cellulose derivatives having an affinity for acid dyestuffs in which the nitrogen of an amino group is directly attached to a carbon atom of the cellulose residue, said derivatives also containing ether groups, said cellulose derivatives being produced by acting at 150°–250° C. with an aqueous solution of an amine on hydroxy groups directly attached to cellulose residues.

HENRY DREYFUS.